Patented Mar. 25, 1930

1,751,817

UNITED STATES PATENT OFFICE

WEBSTER N. JONES AND HERBERT A. WINKELMANN, OF AKRON, OHIO, ASSIGNORS TO THE B. F. GOODRICH COMPANY, OF NEW YORK, N. Y., A CORPORATION OF NEW YORK

RUBBER DERIVATIVE AND METHOD OF MAKING SAME

No Drawing.    Application filed April 28, 1925.   Serial No. 26,520.

This invention relates to methods of producing thermoplastic derivatives of rubber by treating rubber with certain salts of amphoteric metals capable of reacting therewith, and to the products of such reaction.

An object of this invention is to provide derivatives of rubber having changed physical and chemical properties, particularly a higher degree of heat plasticity and a less chemical unsaturation than the rubber from which the derivatives are made, and further to provide a process of manufacture which shall economically produce derivatives of rubber having these changed properties.

It has been found that certain salts of amphoteric metals react with rubber, when intimate mixtures thereof are heated to moderately high temperature, to form materials which are heat plastic at relatively low temperatures. Generally, the halides of amphoteric metals, the fluorides excepted, can be made to bring about these changes in rubber, the following salts having been found to be particularly adapted for reaction with rubber to give heat plastic products: aluminum chloride, aluminum bromide, aluminum iodide, antimony chloride, antimony bromide, antimony iodide, bismuth chloride, chromium bromide, ferric chloride, ferric bromide, ferrous bromide, ferrous iodide, manganese iodide, stannous chloride, stannic iodide, vanadium chloride, zirconium chloride, zinc chloride, zinc bromide, and zinc iodide.

*Example I.*—As an example of the preparation of a thermoplastic product by the use of the above named salts, take 10 parts by weight of ferric chloride and intimately disperse it through 100 parts by weight of crude rubber, preferably by milling the reagent into the rubber, as on a rubber mill, and subject the mass to dry-heat at 160° C. for 15 hours. A strong exothermal reaction takes place between the salt and the rubber, the temperature of the mix rising to 200–250° C. The resulting product is a hard, brittle heat-plastic material having a relatively low softening temperature. It is black in color, breaks with a conchoidal fracture and is chemically less unsaturated than the rubber from which it is prepared.

*Example II.*—A somewhat different product in appearance but one otherwise having very similar physical and chemical properties is prepared by mixing 20 parts of antimony bromide into 100 parts of crude rubber and subjecting the mass to heat for 15 hours at 160° C. The reaction is strongly exothermal and the resulting product, when cooled, is hard, brittle and shellac-like, and distinctly brown in color.

*Example III.*—As a further example, take 20 parts by weight of zinc iodide and intimately disperse it through 100 parts by weight of crude rubber and place the mass in dry heat at 160° C. for 15 hours. A strong exothermal reaction takes place between the salt and the rubber, resulting in a heat-plastic product of low softening temperature, in its plasticity characteristics not unlike gum chicle.

Similarly, any of the salts hereinabove listed may be mixed with rubber, in the proportion of 20 parts of the salt to 100 parts of rubber, and the mixture heated to produce thermoplastic products, which are commonly black or dark colored, altho the products from zinc chloride, and zinc bromide are brown and somewhat transparent, those from antimony chloride and antimony bromide, and aluminum chloride yellow, the latter also displaying a green fluorescence, that from stannous chloride cream color, and that from bismuth chloride a light gray. All are heat plastic at relatively low temperatures and may be readily heat-molded to form articles of desired shapes.

In carrying out the reactions with the several halides of the amphoteric metals herein above named, we have found that in many cases the iodides act most vigorously and that the chlorides are least active in their reaction with rubber. Thus, there is evidence of a tendency for the activity of the halides to increase with the atomic weight of the halogen component thereof, and this may possibly explain the apparent inactivity of the fluorides in the reactions of the type presented herein. The terminology of the claims which recite "a halide of an amphoteric metal in which the halogen has an atomic weight of 35.46 or greater" is limited to binary compounds of the type MX, where M represents an amphoteric metal and X represents chlorine, bromine or iodine.

We claim:

1. The method of producing a composition of matter which comprises incorporating into rubber a halide of an amphoteric metal in which the halogen has an atomic weight of 35.46 or greater, and applying heat to the mix sufficiently to cause a pronounced exothermal temperature rise therein.

2. The method of producing a composition of matter which comprises incorporating into rubber a chloride of an amphoteric metal, and applying heat to the mix sufficiently to cause a pronounced exothermal temperature rise therein.

3. The method of producing a composition of matter which comprises incorporating into rubber a halide of iron in which the halogen has an atomic weight of 35.46 or greater, and applying heat to the mix sufficiently to cause a pronounced exothermal temperature rise therein.

4. The method of producing a composition of matter which comprises incorporating into rubber ferric chloride, and applying heat to the mix sufficiently to cause a pronounced exothermal temperature rise therein.

5. The method of producing a composition of matter which comprises mixing into undissolved rubber a halide of an amphoteric metal in which the halogen has an automic weight of 35.46 or greater, and applying heat to the mix sufficiently to cause a pronounced exothermal temperature rise therein.

6. A composition of matter comprising the reaction product of rubber and a halide of an amphoteric metal in which the halogen has an atomic weight of 35.46 or greater.

7. A composition of matter comprising the reaction product of rubber and a chloride of an amphoteric metal.

8. A composition of matter comprising the reaction product of rubber and a halide of iron in which the halogen has an atomic weight of 35.46 or greater.

9. A composition of matter comprising the reaction product of rubber and ferric chloride.

10. A composition of matter comprising the reaction product of undissolved rubber and a halide of an amphoteric metal in which the halogen has an atomic weight of 35.46 or greater.

11. A composition of matter comprising the reaction product of rubber and a chloride of a metal from the group consisting of antimony, iron, and tin.

12. The composition of matter comprising the reaction product of rubber and a halide of a metal selected from the group consisting of aluminum, antimony, bismuth, chromium, iron, manganese, tin, vanadium and zirconium, in which the halogen has an atomic weight of 35.46 or greater.

13. A composition of matter comprising the reaction product of rubber with a binary compound of the type MX, where M represents an amphoteric metal and X represents chlorine, bromine, or iodine.

In witness whereof we have hereunto set our hands this 25th day of April, 1925.

WEBSTER N. JONES.
HERBERT A. WINKELMANN.